(12) United States Patent
Bae et al.

(10) Patent No.: US 8,593,980 B2
(45) Date of Patent: Nov. 26, 2013

(54) FEEDBACK GENERATION METHOD AND SYSTEM FOR UPLINK TRANSMIT POWER CONTROL

(75) Inventors: Jung Sook Bae, Daejeon (KR); Hyungu Hwang, Daejeon (KR); Daeho Kim, Daejeon (KR); Yeong Jin Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 424 days.

(21) Appl. No.: 12/873,820

(22) Filed: Sep. 1, 2010

(65) Prior Publication Data

US 2011/0141931 A1 Jun. 16, 2011

(30) Foreign Application Priority Data

Dec. 15, 2009 (KR) ........................ 10-2009-0124501

(51) Int. Cl.
*H04W 4/00* (2009.01)
(52) U.S. Cl.
USPC ........................................... 370/252; 370/318
(58) Field of Classification Search
None
See application file for complete search history.

(56) References Cited

U.S. PATENT DOCUMENTS

| | | | | |
|---|---|---|---|---|
| 5,216,692 A * | 6/1993 | Ling | ............................... | 375/130 |
| 6,335,923 B2 * | 1/2002 | Kubo et al. | .................... | 370/335 |
| 6,418,137 B1 * | 7/2002 | Bontu et al. | ................... | 370/347 |
| 6,490,460 B1 * | 12/2002 | Soliman | ......................... | 455/522 |
| 6,792,248 B1 * | 9/2004 | Naghian | .......................... | 455/69 |
| 6,823,173 B2 * | 11/2004 | Srey et al. | ......................... | 455/59 |
| 7,200,127 B1 * | 4/2007 | Lee et al. | ....................... | 370/335 |
| 7,702,354 B2 * | 4/2010 | Kawasaki | ....................... | 455/522 |
| 7,724,813 B2 * | 5/2010 | Wang et al. | .................... | 375/227 |
| 8,050,702 B2 * | 11/2011 | Iizuka et al. | ................... | 455/522 |
| 2006/0093026 A1 * | 5/2006 | Montojo et al. | ............... | 375/225 |
| 2006/0252447 A1 | 11/2006 | Muharemovic et al. | | |
| 2008/0214196 A1 * | 9/2008 | Sambhwani et al. | .......... | 455/446 |
| 2009/0052371 A1 * | 2/2009 | Ariyur | ........................... | 370/318 |

FOREIGN PATENT DOCUMENTS

| | | |
|---|---|---|
| JP | 7-273722 | 10/1995 |
| KR | 2001-0080657 | 8/2001 |
| KR | 1020080085317 | 9/2008 |
| KR | 10-2008-0101896 | 11/2008 |
| KR | 1020090102594 | 9/2009 |

* cited by examiner

*Primary Examiner* — Hassan Kizou
*Assistant Examiner* — Roberta A Shand
(74) *Attorney, Agent, or Firm* — Nelson Mullins Riley & Scarborough LLP

(57) ABSTRACT

A feedback generation method for uplink Transmit Power Control (TPC) in a mobile communication system is provided. A feedback generation system for uplink TPC includes an uplink information receiver to receive uplink information from a terminal, to measure a Signal-to-Interference Noise Ratio (SINR) value with respect to the received uplink information, and to measure a movement speed of the terminal, a transmission power adjustment value setting unit to set a transmission power adjustment value based on the movement speed of the terminal; an adjusted SINR calculator to calculate an adjusted SINR value, based on an expected SINR value and the measured SINR value; and a feedback information regenerator to regenerate feedback information based on the transmission power adjustment value and the adjusted SINR value, and to transmit the regenerated feedback information to the terminal.

12 Claims, 4 Drawing Sheets

FEEDBACK GENERATION METHOD AND SYSTEM FOR UPLINK TRANSMIT POWER CONTROL

CROSS-REFERENCE TO RELATED APPLICATION

This application claims the benefit of Korean Patent Application No. 10-2009-0124501 filed on Dec. 15, 2009, in the Korean Intellectual Property Office, the disclosure of which is incorporated herein by reference.

BACKGROUND

1. Field of the Invention

The present invention relates to a feedback generation method for uplink Transmit Power Control (TPC) in a mobile communication system, and more particularly, to a method that may determine a unit for TPC adjustment by reflecting a wireless channel state using a Signal-to-Interference Noise Ratio (SINR) and information on a movement speed of a terminal, and may generate feedback information, to prevent an unnecessary power control.

2. Description of the Related Art

In an Orthogonal Frequency-Division Multiple Access (OFDMA)-based wideband mobile communication system, an uplink closed loop Transmit Power Control (TPC) may be performed based on TPC feedback information, such as a TPC command transmitted by a base station.

Here, the TPC feedback information may be induced by a Signal-to-Interference Noise Ratio (SINR) for each terminal measured by the base station.

However, in the uplink closed loop TPC, generation of the TPC feedback information using only the SINR reflects only a wireless channel state for recently received uplink information, which may lead to an unnecessary power control when a terminal moves to a domain ensuring another channel state.

Thus, there is a desire for a method that may control a power based on a mobility of a terminal.

SUMMARY

An aspect of the present invention provides a feedback generation system for uplink Transmit Power Control (TPC) that may determine a unit for TPC adjustment by reflecting a wireless channel state using a Signal-to-Interference Noise Ratio (SINR) and information on a movement speed of a terminal, and may generate feedback information, to prevent an unnecessary power control.

According to an aspect of the present invention, there is provided a feedback generation system for an uplink TPC, the feedback generation system including an uplink information receiver to receive uplink information from a terminal, to measure an SINR value with respect to the received uplink information, and to measure a movement speed of the terminal; a transmission power adjustment value setting unit to set a transmission power adjustment value based on the movement speed of the terminal; an adjusted SINR calculator to calculate an adjusted SINR value, based on an expected SINR value and the measured SINR value; and a feedback information regenerator to regenerate feedback information based on the transmission power adjustment value and the adjusted SINR value, and to transmit the regenerated feedback information to the terminal.

Here, the feedback information regenerator may determine a unit coefficient of a TPC to be adjusted, based on the adjusted SINR value, and may regenerate the feedback information using the transmission power adjustment value and the adjusted SINR value based on the determined unit coefficient.

According to an aspect of the present invention, there is provided a feedback generation method for an uplink TPC, the feedback generation method including receiving uplink information from a terminal; measuring an SINR value with respect to the received uplink information; measuring a movement speed of the terminal; setting a transmission power adjustment value based on the movement speed of the terminal; calculating an adjusted SINR value based on an expected SINR value and the measured SINR value; regenerating feedback information based on the transmission power adjustment value and the adjusted SINR value; and transmitting the regenerated feedback information to the terminal.

EFFECT

According to embodiments of the present invention, a unit for TPC adjustment may be determined by reflecting a wireless channel state using a Signal-to-Interference Noise Ratio (SINR) and information on a movement speed of a terminal, and may generate feedback information, and thus, it is possible to prevent an unnecessary power control to efficiently control an uplink power.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
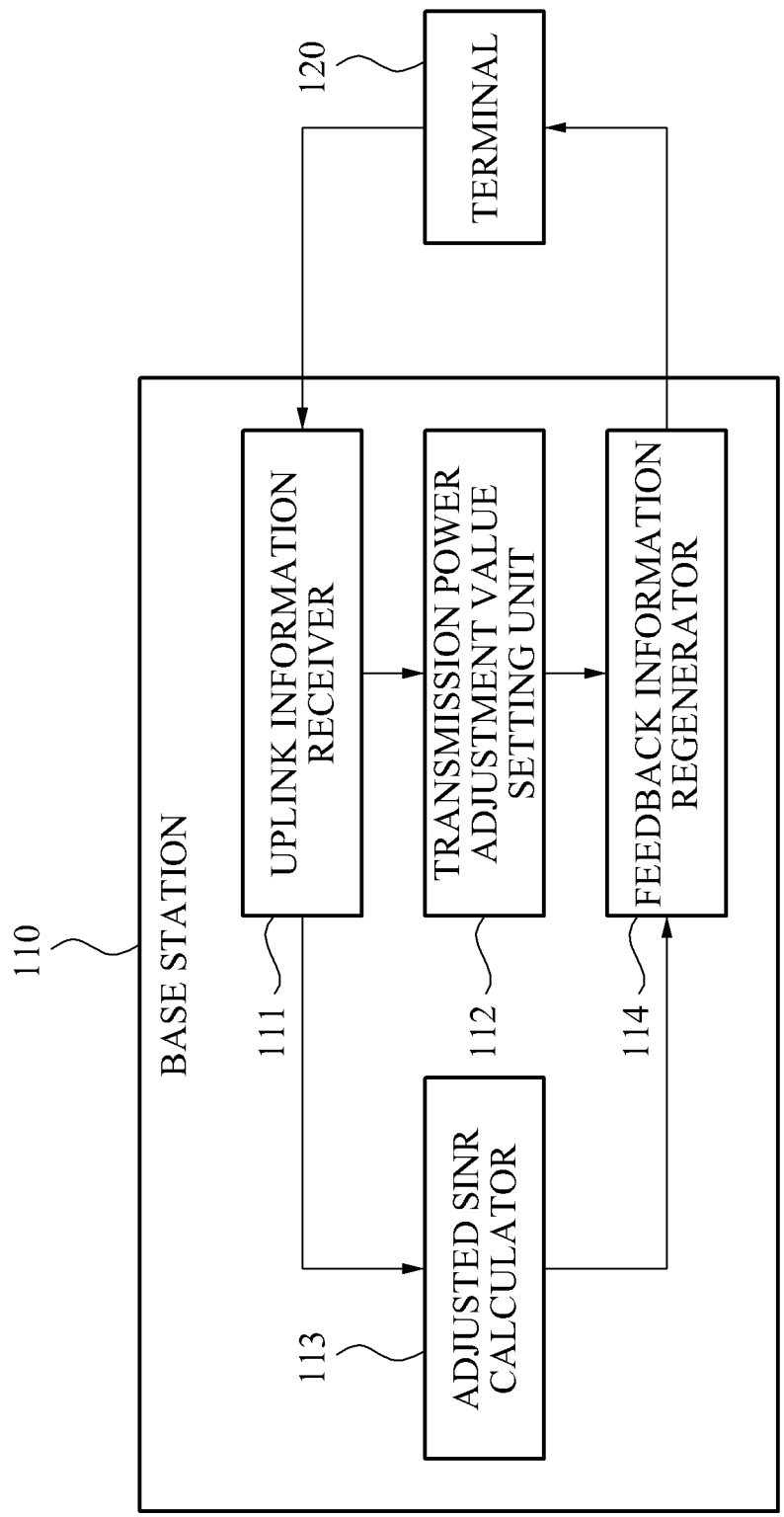
FIG. 1 is a block diagram illustrating an example of a feedback generation system for uplink Transmit Power Control (TPC) according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating an example of a feedback generation system for uplink Transmit Power Control (TPC) according to an embodiment of the present invention.

The feedback generation system of FIG. 1 includes a base station 110, and a terminal 120. The base station 110 may generate a feedback for the uplink TPC, and the terminal 120 may transmit uplink information to the base station 110 based on the generated feedback.

The base station 110 may receive the uplink information from the terminal 120, may generate a TPC feedback for uplink TPC of the terminal 120 based on a Signal-to-Interference Noise Ratio (SINR) value with respect to the uplink information and a movement speed of the terminal 120, and may transmit the generated TPC feedback to the terminal 120.

The base station 110 may include an uplink information receiver 111, a transmission power adjustment value setting unit 112, an adjusted SINR calculator 113, and a feedback information regenerator 114, as shown in FIG. 1.

The uplink information receiver 111 may receive the uplink information from the terminal 120, may measure $SINR_{RCV}$ that is the SINR value with respect to the uplink information, and may also measure the movement speed of the terminal 120.

The transmission power adjustment value setting unit 112 may set TPC_Step based on the movement speed of the terminal 120 measured by the uplink information receiver 111. Here, TPC_Step refers to a transmission power adjustment value used for TPC.

In an example, when the terminal 120 is moving at a high speed, the terminal 120 may be moved to a domain of another base station, and may be likely to transmit uplink data in a domain that is different from a current channel state. In this example, the transmission power adjustment value setting unit 112 may set TPC_Step to be $S_{TPCSTEP}$ that is a power adjustment value in relatively small units.

In another example, when the terminal 120 is moving at a relatively low speed, the terminal 120 may be likely to transmit uplink data in a domain that is similar to a current channel state, due to a relatively small movement range of the terminal 120. In this example, the transmission power adjustment value setting unit 112 may set TPC_Step to be $S_{TPCSTEP}$ that is a power adjustment value in relatively large units, in order to more actively control a transmission power.

The adjusted SINR calculator 113 may calculate $SINR_{ADJ}$ that is an adjusted SINR value, based on $SINR_{THRESHOLD}$ and $SINR_{RCV}$ measured by the uplink information receiver 111. Here, $SINR_{THRESHOLD}$ may be an SINR value expected as an optimal SINR value.

Specifically, the adjusted SINR calculator 113 may calculate $SINR_{ADJ}$ by subtracting $SINR_{RCV}$ from $SINR_{THRESHOLD}$.

The feedback information regenerator 114 may regenerate feedback information using TPC_Step set by the transmission power adjustment value setting unit 112, and $SINR_{ADJ}$ calculated by the adjusted SINR calculator 113, and may transmit the regenerated feedback information to the terminal 120.

Specifically, the feedback information regenerator 114 may determine $TPC_{ADJ}$ that is a unit coefficient of a TPC to be adjusted, based on $SINR_{ADJ}$, and may regenerate feedback information using TPC_Step and $SINR_{ADJ}$ based on $TPC_{ADJ}$. Here, the feedback information regenerator 114 may determine $TPC_{ADJ}$ by dividing $SINR_{ADJ}$ by TPC_level that is a unit coefficient for TPC adjustment.

When $TPC_{ADJ}$ is greater than "0" that indicates a high transmission power, the feedback information regenerator 114 may multiply, by "−1", a value obtained by multiplying TPC_Step by $TPC_{ADJ}$, and may regenerate negative $TPC_{FEEDBACK}$ that is negative feedback information, as shown in Equation 1 below, to lower the transmission power to prevent an unnecessary power consumption and an interference with other terminals.

$$TPC_{FEEDBACK}=TPC_{ADJ}*TPC\_Step*-1 \quad \text{[Equation 1]}$$

Conversely, when $TPC_{ADJ}$ is less than "0" that indicates a low transmission power, the feedback information regenerator 114 may multiply TPC_Step by $TPC_{ADJ}$, and may regenerate positive $TPC_{FEEDBACK}$ that is positive feedback information, as shown in Equation 2 below, to increase the transmission power to improve a transmission quality.

$$TPC_{FEEDBACK}=TPC_{ADJ}*TPC\_Step \quad \text{[Equation 2]}$$

Additionally, the feedback information regenerator 114 may determine whether the regenerated feedback information is equal to "0" or different from "0." When the regenerated feedback information is determined to be equal to "0," the feedback information regenerator 114 may not transmit the regenerated feedback information to the terminal 120.

The terminal 120 may receive the regenerated feedback information from the base station 110, may determine a new transmission power based on the regenerated feedback information, and may transmit the uplink information to the base station 110 based on the new transmission power.

Figure 2:
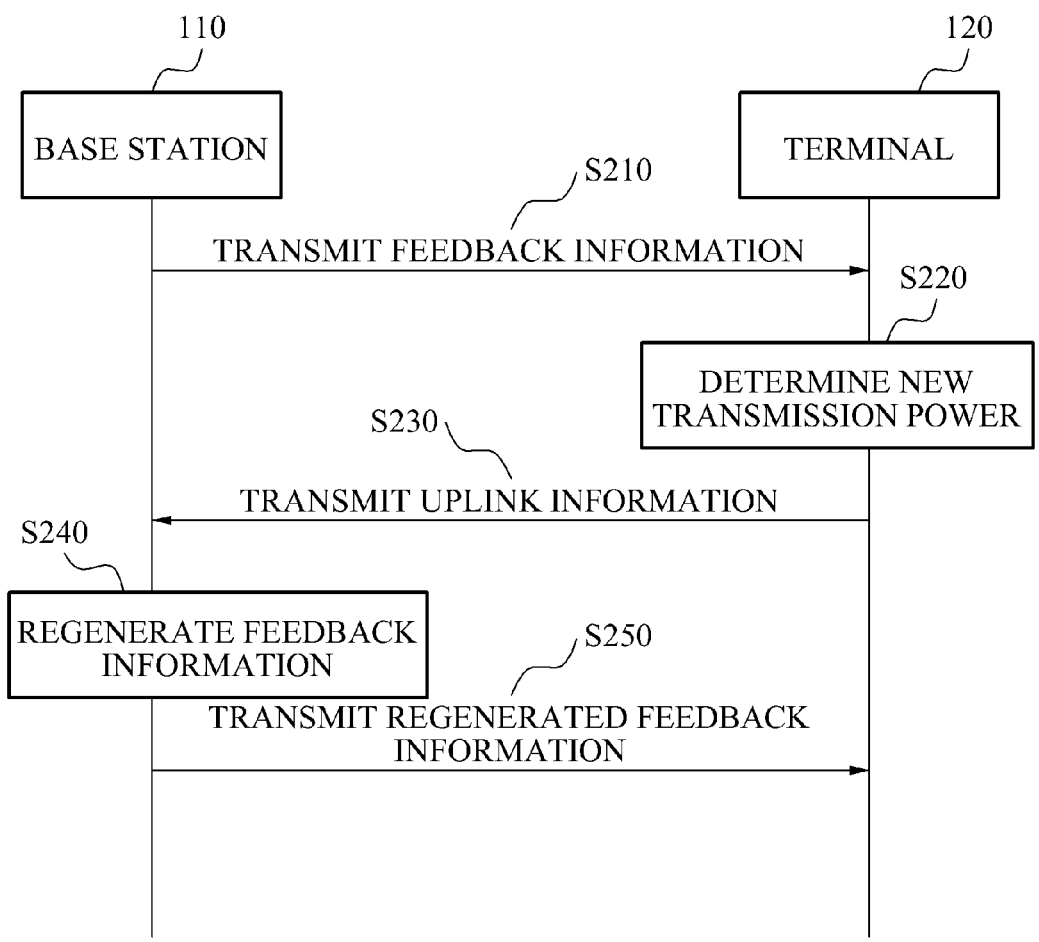
FIG. 2 is a flowchart illustrating a feedback generation method for uplink TPC according to an embodiment of the present invention.

FIG. 2 is a flowchart illustrating a feedback generation method for uplink TPC according to an embodiment of the present invention.

In operation S210, the base station 110 may transmit feedback information to the terminal 120.

In operation S220, the terminal 120 may determine a new transmission power based on the feedback information received in operation S210.

In operation S230, the terminal 120 may transmit uplink information to the base station 110 based on the new transmission power determined in operation S220.

In operation S240, the base station 110 may regenerate feedback information based on the uplink information received from the terminal 120 in operation S230.

Operation S240 will be further described with reference to FIG. 3 below.

In operation S250, the base station 110 may transmit, to the terminal 120, the feedback information regenerated in operation S240.

Here, the terminal 120 may perform operations S220 and S230 to determine a new transmission power based on the regenerated feedback information received in operation S250 and to transmit uplink information to the base station 110 based on the determined new transmission power.

Figure 3:
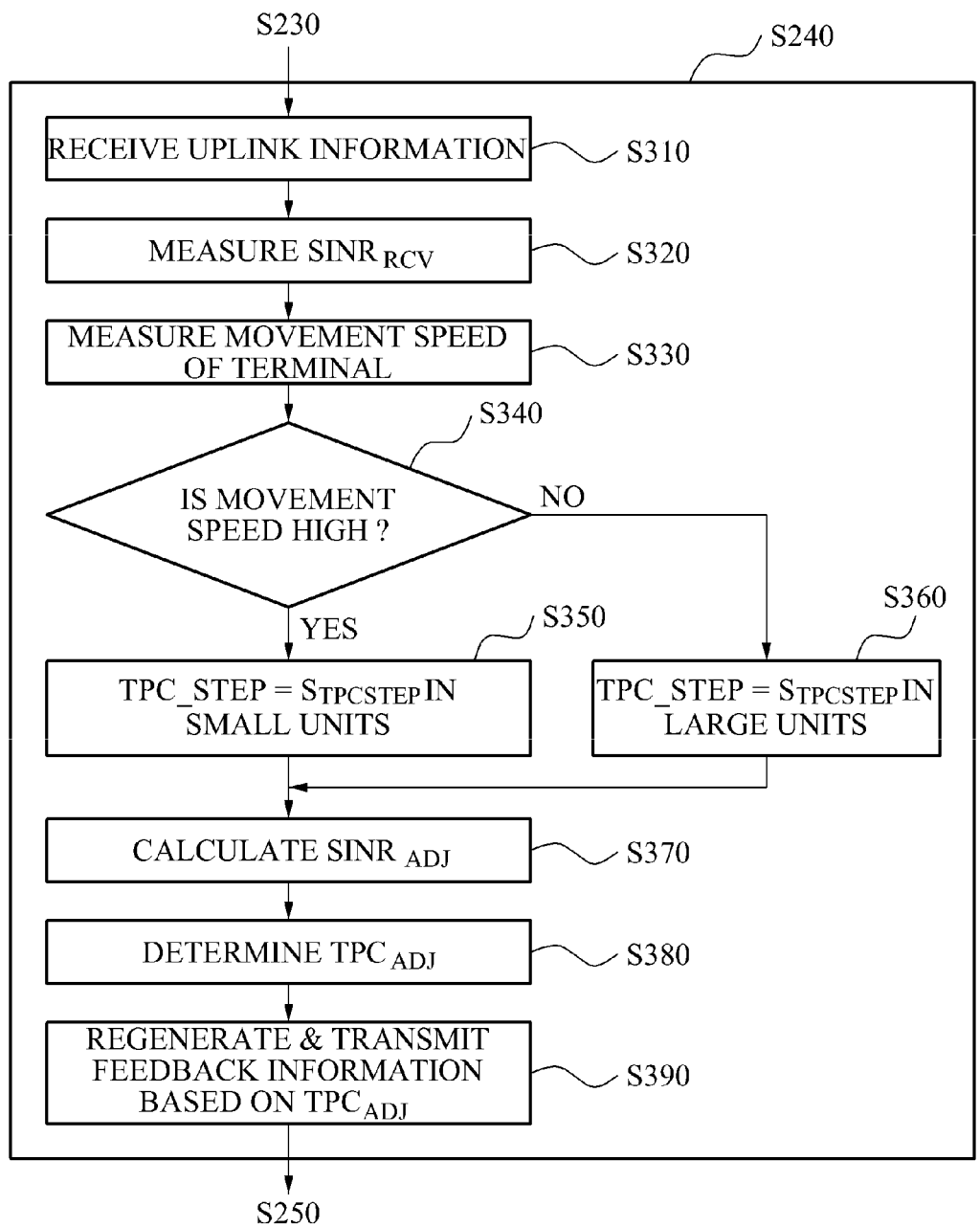
FIG. 3 is a flowchart illustrating an operation of regenerating feedback information according to an embodiment of the present invention.

FIG. 3 is a flowchart illustrating an operation of regenerating feedback information according to an embodiment of the present invention. Operations S310 through S390 of FIG. 3 may be included in operation S240 described above with reference to FIG. 2.

In operation S310, the uplink information receiver 111 may receive uplink information from the terminal 120.

In operation S320, the uplink information receiver 111 may measure $SINR_{RCV}$ with respect to the uplink information received in operation S310.

In operation S330, the uplink information receiver 111 may measure a movement speed of the terminal 120.

In operation S340, the transmission power adjustment value setting unit 112 may determine whether the movement speed of the terminal 120 measured in operation S330 is movement speed high or low" and change "NO"→"LOW" and "YES"→"HIGH"

When the movement speed of the terminal 120 is determined to be high in operation S340, the transmission power adjustment value setting unit 112 may set TPC_Step to be $S_{TPCSTEP}$ that is a power adjustment value in small units in operation S350.

Conversely, when the movement speed of the terminal 120 is determined to be low in operation S340, the transmission power adjustment value setting unit 112 may set TPC_Step to be $S_{TPCSTEP}$ that is a power adjustment value in large units in operation S360.

In operation S370, the adjusted SINR calculator 113 may calculate $SINR_{ADJ}$ based on $SINR_{THRESHOLD}$, and $SINR_{RCV}$ measured by the uplink information receiver 111. Specifically, the adjusted SINR calculator 113 may calculate $SINR_{ADJ}$ by subtracting $SINR_{RCV}$ from $SINR_{THRESHOLD}$.

In operation S380, the feedback information regenerator 114 may determine $TPC_{ADJ}$ based on $SINR_{ADJ}$ calculated in operation S370. Specifically, the feedback information regenerator 114 may divide $SINR_{ADJ}$ by TPC_level, to determine $TPC_{ADJ}$.

In operation S390, the feedback information regenerator 114 may regenerate feedback information using TPC_Step and $SINR_{ADJ}$ based on $TPC_{ADJ}$ determined in operation S380, and may transmit the regenerated feedback information to the terminal 120.

Operation S390 will be further described with reference to FIG. 4 below.

Figure 4:
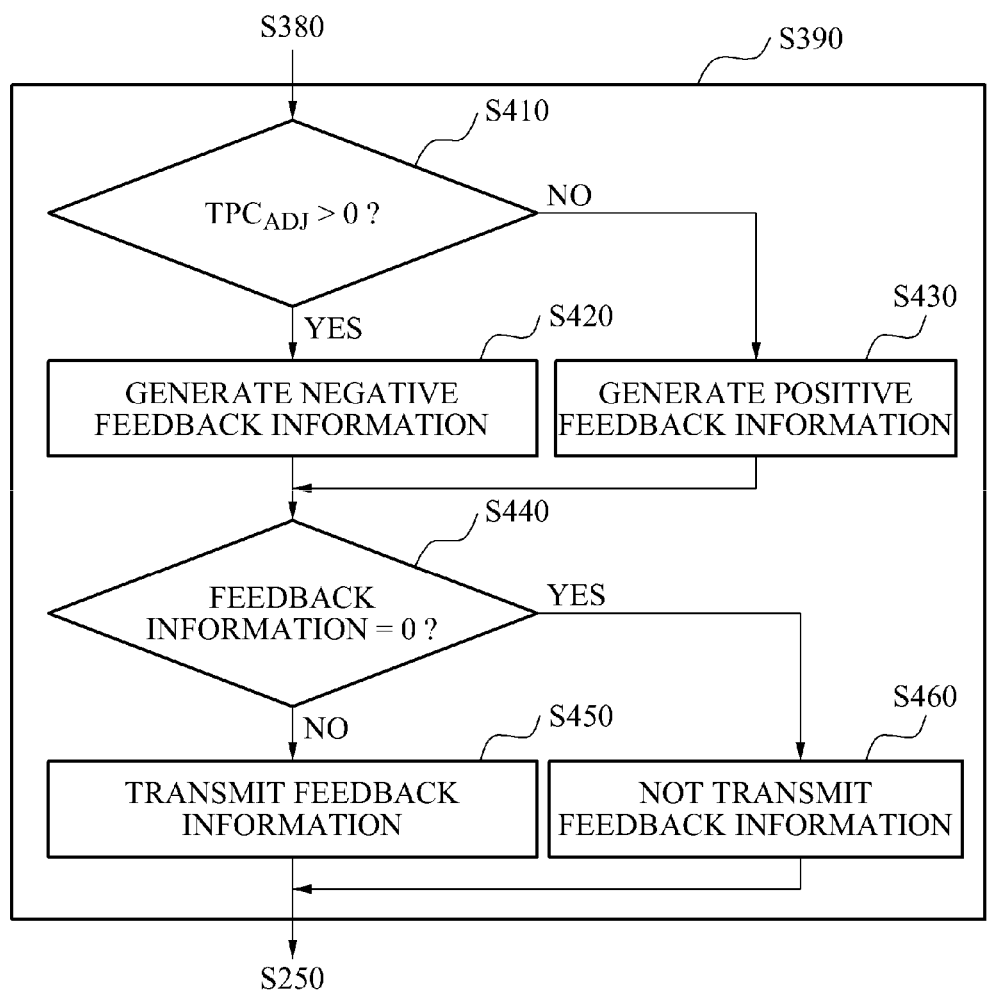
FIG. 4 is a flowchart illustrating an operation of regenerating feedback information and transmitting the feedback information according to an embodiment of the present invention.

FIG. 4 is a flowchart illustrating an operation of regenerating feedback information and transmitting the regenerated feedback information according to an embodiment of the present invention. Operations S410 through S460 of FIG. 4 may be included in operation S390 described above with reference to FIG. 3.

In operation S410, the feedback information regenerator 114 may determine whether $TPC_{ADJ}$ determined in operation S380 is greater than "0", or less than "0."

When $TPC_{ADJ}$ is determined to be greater than "0" in operation S410, the feedback information regenerator 114 may multiply, by "−1", a value obtained by multiplying TPC_Step by $TPC_{ADJ}$, and may regenerate negative feedback information $TPC_{FEEDBACK}$ in operation S420.

Conversely, when $TPC_{ADJ}$ is determined to be less than "0" in operation S410, the feedback information regenerator 114 may multiply TPC_Step by $TPC_{ADJ}$, and may regenerate positive feedback information $TPC_{FEEDBACK}$ in operation S430.

In operation S440, the feedback information regenerator 114 may determine whether the feedback information regenerated in operation S420 or S430 is equal to "0" or different from "0."

When the feedback information is determined to be different from "0" in operation S440, the feedback information regenerator 114 may transmit the feedback information as the regenerated feedback information to the terminal 120 in operation S450.

When the feedback information is determined to be equal to "0" in operation S440, the feedback information regenerator 114 may refrain from transmitting the feedback information to the terminal 120 in operation S460.

As described above, a feedback generation system for uplink TPC according to the present invention may determine a unit for TPC adjustment by reflecting a wireless channel state using an SINR and information on a movement speed of a terminal, and may generate feedback information, to prevent an unnecessary power control so as to efficiently control an uplink power.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A feedback generation system for an uplink Transmit Power Control (TPC), the feedback generation system comprising:
an uplink information receiver to receive uplink information from a terminal, to measure a Signal-to-Interference Noise Ratio (SINR) value with respect to the received uplink information, and to measure a movement speed of the terminal;
an adjusted SINR calculator to calculate an adjusted SINR value, based on an expected SINR value and the measured SINR value; and
a feedback information regenerator to regenerate feedback information based on a transmission power adjustment value and the adjusted SINR value, and to transmit the regenerated feedback information to the terminal,
wherein the transmission power adjustment value is set in small units when the terminal is moving at a high speed, and
the transmission power adjustment value is set in large units when the terminal is moving at a low speed.

2. The feedback generation system of claim 1, wherein the adjusted SINR calculator calculates the adjusted SINR value based on a difference between the expected SINR value and the measured SINR value.

3. The feedback generation system of claim 1, wherein the feedback information regenerator determines a unit coefficient of a TPC to be adjusted, based on the adjusted SINR value, and regenerates the feedback information using the transmission power adjustment value and the adjusted SINR value based on the determined unit coefficient.

4. The feedback generation system of claim 3, wherein the feedback information regenerator multiplies, by −1, a value obtained by multiplying the transmission power adjustment value by the unit coefficient, and regenerates the feedback information, when the unit coefficient is greater than 0.

5. The feedback generation system of claim 3, wherein the feedback information regenerator multiplies the transmission power adjustment value by the unit coefficient, and regenerates the feedback information, when the unit coefficient is less than 0.

6. The feedback generation system of claim 3, wherein the feedback information regenerator does not transmit the regenerated feedback information to the terminal, when the regenerated feedback information is equal to 0.

7. The feedback generation system of claim 1, wherein the terminal receives the regenerated feedback information, determines a new transmission power based on the regenerated feedback information, and transmits the uplink information based on the new transmission power.

8. A feedback generation method for an uplink TPC, the feedback generation method comprising:
receiving uplink information from a terminal;
measuring an SINR value with respect to the received uplink information;
measuring a movement speed of the terminal;
setting a transmission power adjustment value based on the movement speed of the terminal;
calculating an adjusted SINR value based on an expected SINR value and the measured SINR value;
regenerating feedback information based on the transmission power adjustment value and the adjusted SINR value; and
transmitting the regenerated feedback information to the terminal, wherein the setting the transmission power adjustment value comprising:

setting the transmission power adjustment value in small units when the terminal is determined to be moving at the high speed, and setting the transmission power adjustment value in large units when the terminal is determined to be moving at a low speed.

9. The feedback generation method of claim 8, wherein the calculating of the adjusted SINR value comprises calculating the adjusted SINR value based on a difference between the expected SINR value and the measured SINR value.

10. The feedback generation method of claim 8, wherein the regenerating of the feedback information comprises:

determining a unit coefficient of a TPC to be adjusted, based on the adjusted SINR value; and regenerating the feedback information using the transmission power adjustment value and the adjusted SINR value based on the determined unit coefficient.

11. The feedback generation method of claim 10, wherein the regenerating of the feedback information comprises:

determining whether the unit coefficient is greater than 0 or less than 0;

multiplying, by −1, a value obtained by multiplying the transmission power adjustment value by the unit coefficient, and regenerating the feedback information, when the unit coefficient is determined to be greater than 0; and multiplying the transmission power adjustment value by the unit coefficient, and regenerating the feedback information, when the unit coefficient is determined to be less than 0.

12. The feedback generation method of claim 10, wherein the regenerating of the feedback information comprises:

determining whether the regenerated feedback information is equal to 0 or different from 0;

transmitting the regenerated feedback information to the terminal when the regenerated feedback information is determined to be different from 0; and abstaining from transmitting the regenerated feedback information to the terminal when the regenerated feedback information is determined to be equal to 0.

* * * * *